(12) United States Patent
Heinrich et al.

(10) Patent No.: US 10,788,872 B2
(45) Date of Patent: Sep. 29, 2020

(54) SERVER NODE SHUTDOWN

(71) Applicant: Hewlett Packard Enterprise Development LP, Houston, TX (US)

(72) Inventors: David F. Heinrich, Tomball, TX (US); David W. Engler, Cypress, TX (US); Patrick Raymond, Houston, TX (US); William C. Hallowell, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 217 days.

(21) Appl. No.: 15/760,617

(22) PCT Filed: Sep. 21, 2015

(86) PCT No.: PCT/US2015/051258
§ 371 (c)(1),
(2) Date: Mar. 15, 2018

(87) PCT Pub. No.: WO2017/052500
PCT Pub. Date: Mar. 30, 2017

(65) Prior Publication Data
US 2018/0253131 A1    Sep. 6, 2018

(51) Int. Cl.
*G06F 1/30* (2006.01)
*G06F 1/26* (2006.01)
(Continued)

(52) U.S. Cl.
CPC ............ *G06F 1/263* (2013.01); *G06F 1/26* (2013.01); *G06F 1/30* (2013.01); *G06F 11/1004* (2013.01);
(Continued)

(58) Field of Classification Search
CPC .................................. G06F 1/26; G06F 1/30
See application file for complete search history.

(56) References Cited

U.S. PATENT DOCUMENTS 5,781,784 A    7/1998   McKinley
6,246,213 B1   6/2001   Meador
(Continued)

FOREIGN PATENT DOCUMENTS

WO           99/67703 A1      12/1999
WO    WO-2012166441           12/2012

OTHER PUBLICATIONS

"Power solutions for your home and office," Nov. 28, 2011, 20 pps.
(Continued)

*Primary Examiner* — Phil K Nguyen
(74) *Attorney, Agent, or Firm* — Hewlett Packard Enterprise Patent Department

(57) ABSTRACT

Example implementations relate to a server node shutdown. For example, a system includes a control module and a secondary power supply. The control module includes a detect engine to detect an even that triggers a sequenced shutdown of a server node and prevent execution of the sequenced shutdown and execution of a data transfer. The control module also includes an initiate engine to initiate a data backup process, by a basic input/output system (BIOS) of the server node, to write data from a volatile memory location of the server node to a non-volatile memory location of the server node. The secondary power supply is to support the data backup process.

15 Claims, 3 Drawing Sheets

(51) Int. Cl.
  *G06F 11/14* (2006.01)
  *G06F 11/10* (2006.01)
  *G06F 12/0804* (2016.01)
(52) U.S. Cl.
  CPC .......... *G06F 11/14* (2013.01); *G06F 12/0804* (2013.01); *G06F 2212/1032* (2013.01)

(56) References Cited

U.S. PATENT DOCUMENTS

| | | | | |
|---|---|---|---|---|
| 6,304,981 | B1* | 10/2001 | Spears | G06F 11/004 714/22 |
| 8,464,257 | B2 | 6/2013 | Banerjee | |
| 2005/0044447 | A1* | 2/2005 | Dunstan | G06F 1/30 714/14 |
| 2005/0044453 | A1* | 2/2005 | Dunstan | G06F 1/30 714/43 |
| 2006/0206741 | A1* | 9/2006 | Allison | G06F 1/266 713/340 |
| 2007/0150760 | A1* | 6/2007 | Nowlin | G06F 1/3203 713/300 |
| 2007/0255969 | A1* | 11/2007 | Theobald | G06F 1/266 713/320 |
| 2007/0260918 | A1* | 11/2007 | Okada | G06F 1/30 714/14 |
| 2008/0201595 | A1 | 8/2008 | Kawasaki | |
| 2011/0018342 | A1 | 1/2011 | Park et al. | |
| 2011/0184998 | A1 | 7/2011 | Palahnuk et al. | |
| 2012/0102346 | A1 | 4/2012 | Haj-Yihia | |
| 2012/0272085 | A1* | 10/2012 | Wu | G06F 1/30 713/340 |
| 2013/0159735 | A1 | 6/2013 | Hou et al. | |
| 2013/0332751 | A1 | 12/2013 | Iwata | |
| 2016/0179640 | A1* | 6/2016 | Murata | G06F 11/1441 714/14 |
| 2018/0365147 | A1* | 12/2018 | Fevrier | G06F 12/0804 |

OTHER PUBLICATIONS

International Search Report and Written Opinion received for PCT Application No. PCT/US2015/051258, dated Jun. 20, 2016, 9 pages.

* cited by examiner

SERVER NODE SHUTDOWN

BACKGROUND

As reliance on computing systems continues to grow, so too does the demand for reliable power systems and backup schemes for these computing systems. Servers, for example, may provide solutions for backing up data to flash or persistent memory as well as backup power sources for powering this backup of data after an interruption of power. Data may be backed up as part of a sequenced shutdown of a server.

BRIEF DESCRIPTION OF THE DRAWINGS

Some examples of the present application are described with respect to the following figures.

DETAILED DESCRIPTION

Figure 1:
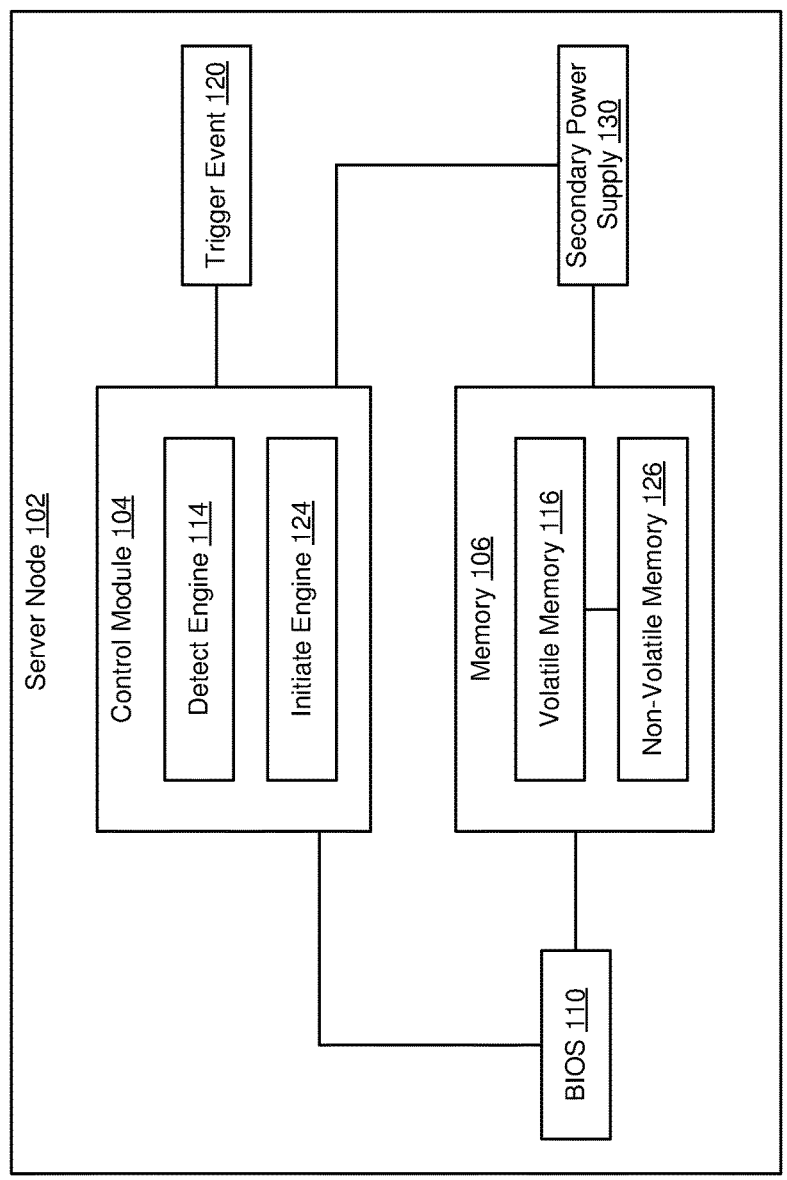
FIG. 1 is a block diagram of an example system for server node shutdown.

A computing and/or data storage system can include a number of nodes that support a number of loads. The nodes can be a number of servers (e.g., a server node), for example. A number of loads can include storage controllers or devices associated with the server nodes. For example, a load can include cache memory, dual in-line memory modules (DIMMs), non-volatile dual in-line memory modules (NVDIMMs), and/or array control logic, among other storage controllers and/or devices associated with the servers.

An interruption of a primary power supply can be scheduled or unscheduled. For instance, a scheduled interruption of the primary power supply can be the result of scheduled maintenance on the number of server nodes and/or the number of loads. An unscheduled primary power supply interruption can be an interruption in the primary power supply. An unscheduled primary power supply interruption can occur when, for example, the primary power supply fails momentarily and/or for an extended period of time. Failure can include an unintentional loss of power to nodes and/or loads from the primary power supply.

An uninterruptible power supply (UPS) such as a micro-uninterruptible power supply (μUPS) can be an integrated secondary power supply that is used to provide emergency power to a load when a primary power supply (e.g., input power source) is interrupted. Interruption of a primary power supply can refer to a power failure, power surge, inadequate power, and/or transient faults. A μUPS can provide near-instantaneous protection from power interruptions by supplying energy stored in batteries, super capacitors, or flywheels, among others.

It may be desirable to move data from volatile memory in the number of nodes to non-volatile memory upon the removal or interruption of primary power supply. However, moving data from volatile memory to non-volatile memory can involve a secondary power supply. The secondary power supply can include an integrated secondary power supply. For example, the integrated secondary power supply can include a μUPS that is used to provide power for moving data from volatile memory to non-volatile memory when the primary power is interrupted. Further, the μUPS can reside in a power supply slot of the server node and/or be a shared μUPS, in that the shared μUPS associated with a particular server node is shared among a plurality of loads associated with that server node. The μUPS can be integrated into the node. That is, a server node can have a μUPS integrated into the body of the server node. With integration of a μUPS into each of the server nodes, a server rack and/or chassis can include a plurality of μUPSs to supply backup power to its plurality of server nodes.

Examples described herein describe a power management policy whereby during a trigger event, such as a loss of primary power supply, that results in a sequenced shutdown of the server node (or power down) of the server node, a data backup process can be initiated to move data from a volatile memory location of the server node to a non-volatile memory location of the server node using backup power supplied by a secondary power supply (e.g., the μUPS). When the trigger event occurs, the sequenced shutdown can be prevented (or at least delayed) and access to data in memory of the server node can be prevented, to prevent loss of data or data corruption. A data backup process is initiated to copy data from volatile memory to non-volatile memory, where the data backup process is supported by the μUPS.

According to the described examples, subsystems or portions of the server node not germane or essential to the backup process such as network interface cards (NICs), real-time clocks (RTCs), storage cards, input/output (I/O) devices, certain processors, baseboard management controllers (BMCs) are allowed to reset or power down (e.g., be placed in a standby or low power mode) to preserve power for the backup process. On the other hand, subsystems and portions of the server node that are germane to the backup process, such as memory devices, processors coupled to the persistent memory, end storage devices (e.g., non-volatile memory drive), peripheral component interconnect express (PCIe) are not reset or powered down (i.e., remain active). Once the backup process has been successfully completed, the server node can fully execute the sequenced shutdown.

In one example, a system includes a control module and a secondary power supply. The control module includes a detect engine to detect an even that triggers a sequenced shutdown of a server node and prevent execution of the sequenced shutdown and execution of a data transfer. The control module also includes an initiate engine to initiate a data backup process, by a basic input/output system (BIOS) of the server node, to write data from a volatile memory location of the server node to a non-volatile memory location of the server node. The secondary power supply is to support the data backup process.

In another example, a method executable by a control module of a server node includes detecting an event that results in a sequenced shutdown of the server node. The method includes preventing execution of the sequenced shutdown and access to memory locations of the server node. The method also includes initiating a write of data from a volatile memory location of the server node to a non-volatile memory location of the server node, where the write is performed by a basic input/output system (BIOS) of the server node and where the write is supported by a secondary power supply of the server node.

In another example, a non-transitory machine-readable medium includes instructions executable by a processing resource of a server node to detect a trigger event that causes the server node to initiate a sequenced shutdown, where the sequenced shutdown includes reset and power down processes. The instructions are executable to prevent initiation of the sequenced shutdown and access to data stored in memory locations of the server node. The instructions are also executable to initiate a data backup process by a basic input/output system (BIOS) of the server node to copy data from a volatile memory location to a non-volatile memory location of the server node, using power supplied by a secondary power supply of the server node.

Referring now to the figures, FIG. 1 is a block diagram of an example system for server node shutdown. System 100 can include a server node 102. Server node 102 can include a number of components such as control module 104, memory 106, secondary power supply 130 (e.g., a μUPS), BIOS 110, and trigger event (or signal) 120.

Secondary power supply 130 refers to a power supply that is an integrated component of the server node 102 and is used to provide power for transferring data from volatile memory 116 to non-volatile memory 126 when a primary power supply (not shown) is interrupted. Secondary power supply 130 can include a μUPS. A μUPS, as used herein, refers to an electrical apparatus that provides a temporary supply of power to a load when a primary power supply is interrupted (e.g., fails) and can be integrated into the body of the server node 102 (e.g., an integrated component of the server node 102). An integrated component of the server node 102, as used herein, can include a separate component from the server node 102 that is combined with the body of the server node 102 such that the server node 102 and the integrated component function together as a single unit. For example, a μUPS can reside in a power supply slot of the server node 102 (e.g., be physically and/or indirectly plugged into a power supply slot of the server node 102). Secondary power supply 130 can be an integrated component of the server node 102 and/or provide the temporary source of power to a load associated with the server node 102 for a threshold time. Secondary power supply 130 can be used to protect hardware and components of the system 100, such as a processing resource (e.g., a central processing unit (CPU) and various systems (e.g., DIMM modules, etc.), from data loss in response to the primary power supply interruption. A primary power supply can include an alternating current (AC) power supply such as voltage from a wall outlet (i.e., mains supply) that is lowered to a desired voltage.

Memory 106 can include volatile memory 116 and non-volatile memory 126. Volatile memory 116 can include memory that depends upon power to store information (e.g., data), such as various types of dynamic random access memory (DRAM), among others. Non-volatile memory 126 can include memory that does not depend upon power to store information. Examples of non-volatile memory 126 can include solid state media such as flash memory, electrically erasable programmable read-only memory (EEPROM), phase change random access memory (PCRAM), NVDIMM, flash accelerators, among others.

Server node 102 can also include BIOS 110 and an operating system (not shown). It should be noted that BIOS 110 and the OS can be a part of the memory 106. For example, memory 106 can include read only memory (ROM) locations storing the BIOS 110 and a separate memory location storing the OS and associated drivers.

Control module 104 can include hardware and/or software to perform the functionality described herein. In certain examples, control module 104 can include logic switch such as electronic component that can break an electric circuit, interrupting current or diverting it. For example, the switch can be a switch-mode power supply type of transformer. In other examples, control module 104 can include a complex programmable logic device (CPLD) that can control power MOSFETs or dedicated voltage regulators. In yet other examples, control module 104 can be a microprocessor, a microcontroller, or a discreet logic module, among others. Control module 104 can include a detect engine 114 and an initiate engine 124. Control module 104 can include additional or fewer engines than are illustrated to perform the various functions as will be described in further details. Control module 104 can perform a number of functionality including managing access to memory 106, transition between primary and secondary power supplies, and managing other devices within the server node 102.

During operation, detect engine 114 can detect an event 120 that triggers a sequenced shutdown of the server node 102. A sequenced shutdown of the server node 102 can include executing a sequence of instructions in powering down the server node 102 such as reset and power down processes. Trigger event 120 can include an expected or unexpected shutdown or power down of the system. For example, trigger event 120 can be a system error, a scheduled shutdown, a user initiated shutdown (e.g., activating a power off button), an OS initiated shutdown, a parity error in a peripheral component interconnect (PCI) bus, a checksum error in a dynamic random-access memory (DRAM), an execution error, or a primary power supply failure, among others. Responsive to the trigger event 120, the detect engine 114 can prevent the execution of the sequenced shutdown and execution of any data transfer operations at least until a data backup process has been completed to mitigate or prevent data loss and corruption.

The initiate engine 124 can initiate the data backup process to write data from the volatile memory 116 to the non-volatile memory 126 using power supplied by the secondary power supply 130. In certain examples, the BIOS 110 can perform the data backup process and write the data from the volatile memory 116 to the non-volatile memory 126. For example, the initiate engine 124 can communicate an instruction to the BIOS 110 to begin the data backup process. In such examples, communication can be via inter-integrated circuit ($I^2C$) and/or other communication mechanism such as extensible firmware interface (UEFI) communication protocols. The initiate engine 124 can also determine if the data backup process has been completed by performing a checksum calculation on the data to verify that the data has been completely and successfully transferred from the volatile memory 116 to the non-volatile memory 126. Upon successful completion of the data backup process, the initiate engine 124 can initiate the sequenced shutdown of the server node 102.

As described above, the control module 104 can include a CPLD and/or other logic devices to perform the functionality of the control module 104. In such an example, the CPLD can assert (or activate) reset and power down processes at a first portion of the server node 102, where the first portion includes subsystems of the server node 102 that are not germane or involved in the data backup processes. For example, the CPLD can assert the reset and power down processes at a real-time clocks (RTCs), network interface cards (NICs), certain storage cards, input/output (I/O), baseband management controllers (BMCs), secondary processors, and encryption devices, among others. Conversely, the CPLD can de-assert the reset and power down processes at a second portion of the server node. The second portion can include subsystems of the server node 102 that are germane to or involved in the data backup processes such as memory subsystems, PCIe subsystems and processors that are associated with the memory subsystems, and end storage devices among others. By selectively activating the reset and power down processes, control module 104 can reserve the secondary backup power supply for components that are germane to the backup process such that the backup process can be successfully completed.

Figure 2:
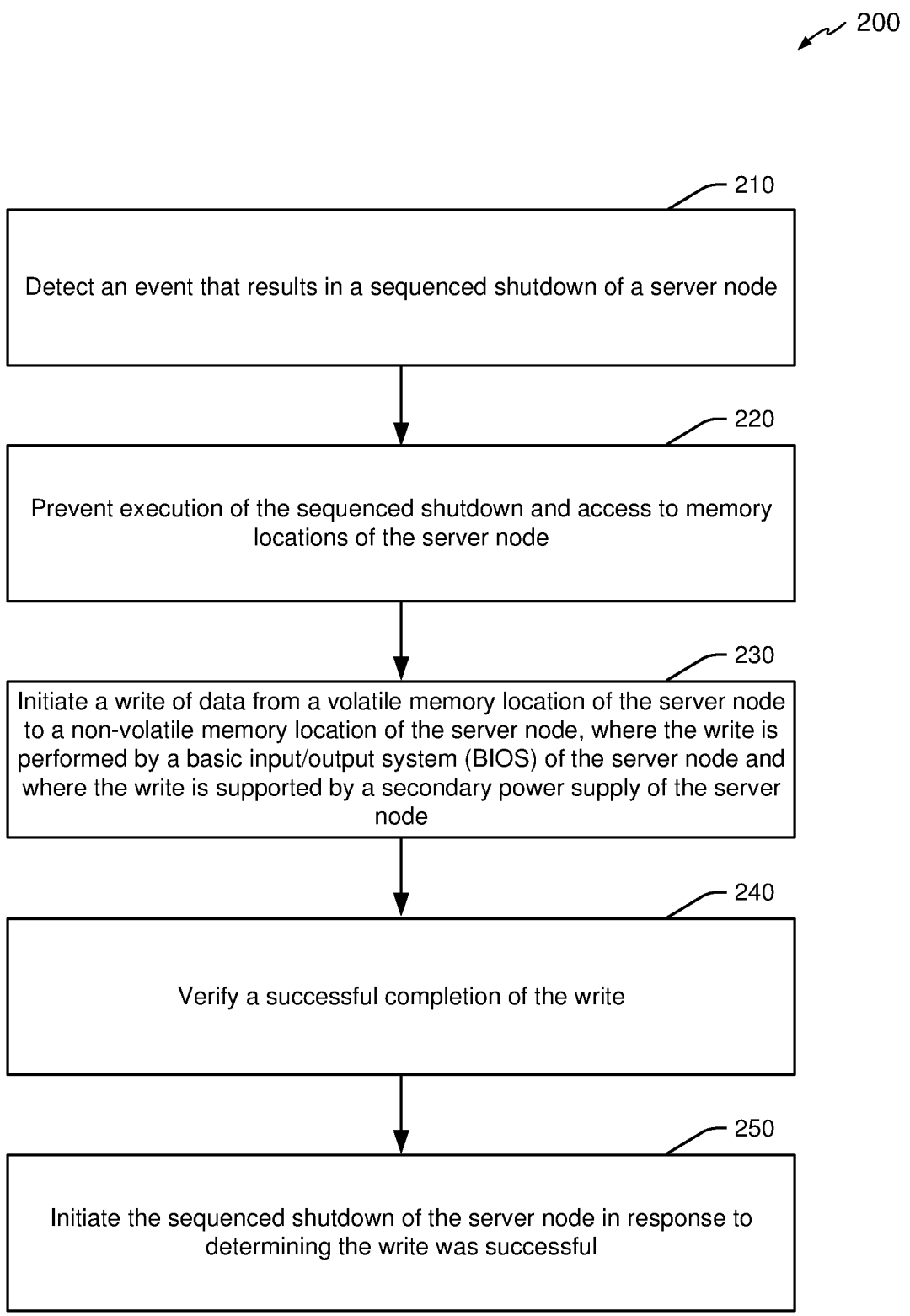
FIG. 2 is a flowchart of an example method for server node shutdown.

FIG. 2 is a flowchart of an example method for server node shutdown. Although execution of method 200 is described below with reference to control module 104 of FIG. 1, other suitable devices for execution of method 200 may be used. Method 200 can be implemented in the form of executable instructions stored on a computer-readable storage medium, such as machine-readable medium 320 of FIG. 3 and/or in the form of electronic circuitry.

Method 200 includes detecting an event that results in a sequenced shutdown of a server node, at 210. For example, control module 104 can detect a trigger event 120 that can result in a sequenced shutdown of the server node 102. The sequenced shutdown can include a sequence of instructions executable to reset and power down the server node 102. In some examples, the trigger event 120 can include expected or unexpected powering down of the system such as a system error, a scheduled shutdown, a user initiated shutdown or an OS initiated shutdown. In other examples, the trigger event 120 can include a failure or interruption of the primary power supply of the server node 102.

Method 200 includes preventing execution of the sequenced shutdown and access to memory locations of the server node, at 220. For example, control module 104 can prevent (or delay) execution of the sequenced shutdown and also prevent access to memory locations of the server node 102 to preserve data integrity. By preventing execution of the sequenced shutdown and access to data in the memory locations, control module 104 can prevent or significantly reduce data loss or data corruption.

Method 200 includes initiating a write of data from a volatile memory location of the server node to a non-volatile memory location of the server node, where the write is performed by a BIOS of the server node and where the write is supported by a secondary power supply of the server node, at 230. For example, control module 104 can communicate instructions to the BIOS 110 to write data from volatile memory 116 to non-volatile memory 126. The control module 104 can also enable or activate the secondary power supply 130 to provide power to support the write operation, for example, by providing power to the BIOS and memory subsystem (e.g., PCIe, memory 106 including volatile memory 116 and non-volatile memory 126, associated processors, etc.).

Method 200 includes verifying a successful completion of the write, at 240. For example, control module 104 can verify that data has been successfully written from the volatile memory 116 to the non-volatile memory 126 by performing a checksum operation on the data.

Method 200 includes initiating the sequenced shutdown of the server node in response to determining that the write was successful, at 250. For example, control module 104 can initiate the sequenced shutdown of the server node 102 upon successful completion of the write operation such that the server node 102 can power down. In some examples, the method 200 of FIG. 2 includes additional steps in addition to and/or in lieu of those depicted in FIG. 2.

Figure 3:
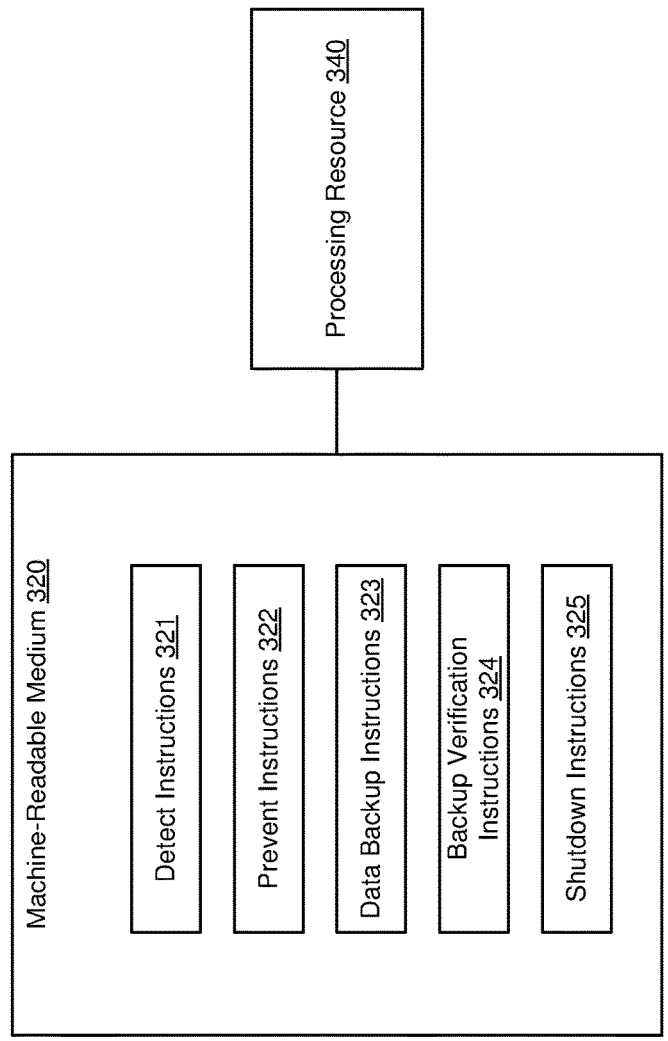
FIG. 3 is a block diagram of an example machine-readable medium including instructions executable by a processing resource to implement a server node shutdown.

FIG. 3 is a block diagram of an example machine-readable medium including instructions executable by a processing resource to implement a server node shutdown. Server node 300 can include any combination of hardware and program instructions to share information. The hardware, for example, can include a processing resource 340 and/or a machine-readable storage medium 320 (e.g., non-transitory computer-readable medium (CRM), machine-readable medium (MRM), database, etc.). Processing resource 340, as used herein, can include any number of processors capable of executing instructions stored by storage medium 320. Processing resource 340 can be implemented in a single device or distributed across multiple devices. The program instructions (e.g., computer readable instructions (CRI)) can include instructions stored on the storage medium 320 and executable by the processing resource 340 to implement a desired function).

The storage medium 320 can be in communication with the processing resource 340 via communication link (e.g., a path). The communication link can be local or remote to the server node 300 associated with the processing resource 340. Examples of a local communication link can include an electronic bus internal to the server node 300 where the storage medium 320 is one of volatile, non-volatile, fixed, and/or removable storage medium in communication with processing resource 340 via the electronic bus.

A number of instructions (e.g., instructions 321-325) can include CRI that when executed by the processing resource 340 can perform functions. The number of instructions can be sub-instructions of other instructions. In another example, the number of instructions can comprise individual instructions at separate and distinct locations (e.g., CRM, etc.).

Each of the number of instructions can include instructions that when executed by the processing resource 340 can function as a corresponding engine as described herein. For example, the detect instructions 321 and prevent instructions 322 can include instructions that when executed by the processing resource 340 can function as the detect engine 114. In another example, the data backup instructions 323, the backup verification instructions 324, and the shutdown instructions 325 can include instructions that when executed by the processing resource 340 can function as the initiate engine 124.

Detect instructions 321 can be executed by the processing resource 340 to detect a trigger event that causes the server node to initiate a sequenced shutdown, where the sequenced shutdown includes reset and power down processes. Detecting the trigger event can include detecting events 120 such as a system error, a scheduled shutdown, a user initiated shutdown (e.g., activating a power off command), an OS initiated shutdown, etc. Thus, the trigger event 120 can be an expected or unexpected shutdown or power down of the server node 102.

Prevent instructions 322 can be executed by the processing resource 340 to prevent initiation of the sequenced shutdown and access to data stored in memory locations of the server node 102. For example, instructions 322 can prevent the execution of a series of instructions to shut down the server node 102 and prevent access to volatile and non-volatile memory locations of the server node 102.

Initiate instructions 323 can be executed by the processing resource 340 to initiate a data backup process by the BIOS 110 of the server node 102 to copy data from the volatile memory 116 to the non-volatile memory 126, using power supplied by the secondary power supply 130 of the server node 102. Initiating the data backup process can include instructions to activate the BIOS 110 to write data from the volatile memory 116 to the non-volatile memory 126, and instructions to activate the secondary power supply 130 to provide backup power to support the backup process. The secondary power supply 130 can be a μUPS.

Backup verification instructions 324 can be executed by the processing resource 340 to verify that the data backup process has been successfully completed. Verifying that the data backup process has been successfully completed can include executing checksum operations on the data to verify the successful write of the data from volatile memory 116 to non-volatile memory 126.

Shutdown instructions 325 can be executed by the processing resource 340 to initiate the sequenced shutdown of the server node 102 upon successful completion of the data backup process. Initiating the sequenced shutdown of the server node 102 can include instructions to reset and power down the server node 102.

What is claimed is:

1. A system, comprising:
    a processing resource to execute computer instructions;
    a control module, comprising:
        a detect engine comprising a set of computer instructions running on the processing resource to:
            detect an event that triggers a sequenced shutdown of a server node; and
            prevent execution of the sequenced shutdown and access to memory locations of the server node;
        an initiate engine comprising a set of computer instructions running on the processing resource to initiate a data backup process, by a basic input/output system (BIOS) of the server node, to write data from a volatile memory location of the server node to a nonvolatile memory location of the server node; and
    a secondary power supply to support the data backup process.

2. The system of claim 1, wherein the trigger event includes an expected or unexpected shutdown of the server node comprising at least one of a system error, a scheduled shutdown, a user initiated shutdown, and an operating system (OS) initiated shutdown.

3. The system of claim 1, wherein the initiate engine is to:
    determine if the data backup process has been completed; and
    initiate the sequenced shutdown of the server node upon completion of the data backup process.

4. The system of claim 3, wherein the determination is based on a checksum process to verify that the data backup process is successfully completed.

5. The system of claim 1, wherein the secondary power supply is an uninterruptible power supply (UPS).

6. The system of claim 1, wherein the control module is a complex programmable logic device (CPLD) and wherein the sequenced shutdown of the server node includes activation of reset and power down processes of the server node.

7. The system of claim 6, wherein the CPLD is to:
    assert the reset and power down processes at a first portion of the server node, wherein the first portion comprises subsystems of the server node that are not included in the data backup process; and
    de-assert the reset and power down processes at a second portion of the server node, wherein the second portion comprises subsystems of the server node that are included in the data backup process.

8. A method, executable by a control module of a server node, comprising:
    detecting an event that results in a sequenced shutdown of the server node;
    preventing execution of the sequenced shutdown and access to memory locations of the server node; and
    initiating a write of data from a volatile memory location of the server node to a non-volatile memory location of the server node, wherein the write is performed by a basic input/output system (BIOS) of the server node and wherein the write is supported by a secondary power supply of the server node.

9. The method of claim 8, comprising:
    verifying a successful completion of the write; and initiating the sequenced shutdown of the server node in response to determining the write was successful.

10. The method of claim 9, wherein verifying the successful completing of the write includes performing a checksum process on the data.

11. The method of claim 8, wherein the power down event includes an interruption of primary power supply to the server node and wherein the secondary power supply includes an uninterruptible power supply (UPS).

12. The method of claim 8, wherein initiating the write includes activating the secondary power supply to provide backup power to the server node to write the data from the volatile memory location to the non-volatile memory location.

13. A non-transitory machine-readable medium comprising instructions executable by a processing resource of a server node to:
    detect a trigger event that causes the server node to initiate a sequenced shutdown, wherein the sequenced shutdown includes reset and power down processes;
    prevent initiation of the sequenced shutdown and access to data stored in memory locations of the server node; and
    initiate a data backup process by a basic input/output system (BIOS) of the server node to copy data from a volatile memory location to a nonvolatile memory location of the server node, using power supplied by a secondary power supply of the server node.

14. The medium of claim 13, wherein the instructions are executable to:
    verify that the data backup process has been successfully completed; and
    initiate the sequenced shutdown of the server node upon successful completion of the data backup process.

15. The medium of claim 14, the instructions executable to verify that the data backup process has been successfully completed include instructions executable to perform a checksum operation on the copied data.

* * * * *